US006999566B1

(12) United States Patent
Eason et al.

(10) Patent No.: US 6,999,566 B1
(45) Date of Patent: Feb. 14, 2006

(54) METHOD AND SYSTEM FOR PENDING VOICEMAIL DELETION AND STATUS NOTIFICATION

(75) Inventors: Wendy Eason, Decatur, GA (US); Robert Koch, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 469 days.

(21) Appl. No.: 10/230,636

(22) Filed: Aug. 29, 2002

(51) Int. Cl.
*H04M 1/64* (2006.01)

(52) U.S. Cl. ............................... 379/88.22; 379/88.12; 455/412.2; 455/466; 709/206; 704/270

(58) Field of Classification Search ............ 379/88.18, 379/67.1, 88.12, 88.13, 88.22; 704/270; 369/25.01; 455/466; 709/204, 206
See application file for complete search history.

(56) References Cited

U.S. PATENT DOCUMENTS 5,353,259 A * 10/1994 Howes et al. ............ 369/25.01
5,481,597 A * 1/1996 Given ..................... 379/88.23
6,014,427 A * 1/2000 Hanson et al. ............ 379/67.1
6,175,859 B1 * 1/2001 Mohler ....................... 709/206
6,216,106 B1 * 4/2001 John ......................... 704/270
6,526,127 B1 * 2/2003 Piotrowski et al. ...... 379/88.22
6,549,612 B1 * 4/2003 Gifford et al. ............ 379/67.1
6,625,260 B1 * 9/2003 Brockman et al. ....... 379/88.21
6,735,615 B1 * 5/2004 Iwayama et al. .......... 709/204
6,751,300 B1 * 6/2004 Muller .................... 379/88.18
2003/0224809 A1 * 12/2003 Savinen et al. ............ 455/466
2004/0042595 A1 * 3/2004 Davis et al. ............ 379/88.22

* cited by examiner

*Primary Examiner*—Fan Tsang
*Assistant Examiner*—Shafiul Alam Elahee
(74) *Attorney, Agent, or Firm*—Merchant & Gould

(57) ABSTRACT

A method and system are provided for enabling a sender of a voicemail message to delete that message before it is heard by the intended recipient and to be notified when a pending message is heard by the intended recipient. A voicemail system associated with a recipient receives and stores a voicemail message and, in response thereto, transmits a status message to a voicemail system associated with the sender. Upon user request, a server computer queries the voicemail system associated with the sender for status of a voicemail message, and if still pending, transmits a deletion request to the voicemail system associated with the sender. The deletion request is then sent from the voicemail system associated with the sender to the voicemail system associated with the recipient, which then deletes the message. When the status of a voicemail message changes from pending to heard, a status change message is received by a server computer, which then determines notification preferences and addresses and, subsequently, transmits a notification message to the sender of the voicemail message.

16 Claims, 14 Drawing Sheets

16

16A 16B 16C 16D 16E 16F 16G

| LOGIN | PASSWORD | EMAIL | SMS | SENDER PHONE NUMBER | WAP ADDRESS | PAGER ADDRESS |
|---|---|---|---|---|---|---|
| BOB | ***** | BOB@BOB.COM | 770-123-4567 | 404-123-4567 | 555-123-4567 | 678-123-4567 |

| CONTACT DEVICE PREFERENCE #1 | CONTACT DEVICE PREFERENCE #2 | CONTACT DEVICE PREFERENCE #3 | CONTACT DEVICE PREFERENCE #4 |
|---|---|---|---|
| EMAIL BOB@BOB.COM | PHONE NUMBER 404-123-4567 | WAP ADDRESS 555-123-4567 | PAGER ADDRESS 678-123-4567 |

| SENDER'S DIRECTORY NUMBER | RECIPIENT'S DIRECTORY NUMBER | TIME/DATE | STATUS |
|---|---|---|---|
| 404-123-4567 | 678-123-4567 | 10:55am AUG 2, 2002 | PENDING |

*Fig.3B.*

METHOD AND SYSTEM FOR PENDING VOICEMAIL DELETION AND STATUS NOTIFICATION

TECHNICAL FIELD

Embodiments of the invention generally relate to the field of telecommunications and, more particularly, to the field of voicemail systems.

BACKGROUND OF THE INVENTION

Voicemail is a widely used and increasingly popular means of communication. Existing voicemail systems provide many features that facilitate sending and receiving voice messages. In addition to simply leaving voicemail messages for others, users of existing voicemail systems can use telephones, wireless devices, or even personal computers from virtually any location to check for messages left by others. Despite the large number of features available with existing voicemail systems, there are needs that are not addressed by current systems.

One shortcoming of current voicemail systems is the inability to delete a voicemail message before it is heard by the recipient. This capability would be desirable during those times when a sender leaves a voicemail message for a recipient, but later decides that the voicemail message should not be delivered. For example, a sender may leave an angry voicemail message in the heat of the moment only to regret doing so later. Similarly, a sender may realize that a voicemail message was left that contained the incorrect date or time of an important meeting. Currently, there is no way to correct such a mistake by deleting, or retracting, the sent message.

Another shortcoming of existing voicemail systems is the inability to notify the sender of a voicemail message when the message has been heard by the recipient. It is often desirable for a sender to know when an important voicemail message is actually heard by the recipient. Knowing when a voicemail message has been heard could alleviate anxiety and save time that would be wasted in following up the voicemail message with additional phone calls to ensure that it had been heard.

Therefore, in light of the above, there is a need in the art for a method and system for enabling a sender of a voicemail message to delete the message before it is heard by the recipient. There is a further need in the art for a method and system for notifying the sender of a voicemail message when the message has been heard by the recipient.

SUMMARY OF THE INVENTION

Embodiments of the present invention solve the above-described problems by providing a system and method for enabling the sender of a voicemail message to delete a pending voicemail message and for providing notification regarding the status of a voicemail message to the sender. According to one embodiment of the invention provided herein, a system is provided that includes a voicemail system associated with the recipient, a voicemail system associated with the sender, and a server computer. The voicemail system associated with the recipient, also called the recipient's voicemail system, receives and stores voicemail messages sent by a sender and intended for the recipient. Upon receiving a voicemail message, the recipient's voicemail system transmits a status message to the voicemail system associated with the sender, also called the sender's voicemail system, indicating that a voice mail message has been received. The sender's voicemail system receives the status message from the recipient's voicemail system and stores the status message in a database record associated with the sender.

The server computer can receive a request from the sender to delete a voicemail message. When such a request is received, the server computer queries the sender's voicemail system for the status of the voicemail message stored in the database record. If the message is still pending and has not been heard by the recipient, the server computer sends a request to the sender's voicemail system to delete the voicemail message. In response to receiving the request to delete the voicemail message, the sender's voicemail system transmits a request to the recipient's voicemail system to delete the voicemail message. The recipient's voicemail system then deletes the voicemail message in response to receiving the request to delete from the sender's voicemail system.

According to another embodiment of the invention, a system is provided that can transmit notification messages to the sender of a voicemail message in response to the change in status of the voicemail message. For instance, a notification message may be transmitted to the sender in response to the status of the voicemail message changing from pending to heard. In order to provide this functionality, a sender's voicemail system, a recipient's voicemail system, and a server computer are provided. The recipient's voicemail system receives and stores voicemail messages sent by a sender and intended for the recipient. The recipient's voicemail system then transmits a status message to the sender's voicemail system in response to receiving the voicemail message, delivering the voicemail message to the recipient, or in response to other changes in the status of the voicemail message.

The sender's voicemail system receives the status messages from the recipient's voicemail system and stores the messages in a database record associated with the sender. Upon receiving a status message from the recipient's voicemail system indicating that the voicemail message has been delivered to the recipient, or other status change, the sender's voicemail system transmits a status change message to the server computer.

The server computer receives the status change message from the sender's voicemail system and, in response, identifies a method of notifying the sender of the change in status of the voicemail message and a corresponding notification device address. One or more methods for contacting the sender, such as e-mail, pager, or telephone, and a corresponding device address may be specified by the sender and stored in a database record at the server computer. After identifying the method for notifying the sender and identifying corresponding device addresses, the server computer transmits a notification message to the device address indicating that the status of the voicemail message has changed. This may include, for instance, transmitting a notification message to the sender indicating that the voicemail message had been heard and deleted by the recipient, unheard and deleted by the recipient, or other types of messages.

Embodiments of the invention also provide methods for deleting pending voicemail messages and for notifying a sender that a pending voicemail message has been delivered. A computer-readable medium and computer-controlled apparatus are also provided. Additional details regarding the various embodiments of the invention will become apparent from the detailed description that follows.

BRIEF DESCRIPTION OF THE DRAWINGS

FIG. 3A is a database architecture diagram illustrating a format for a database record maintained by a server computer and utilized in various embodiments of the invention;

FIG. 3B is a database architecture diagram illustrating a format for a database record associated with a sender utilized in various embodiments of the invention;

DETAILED DESCRIPTION OF AN ILLUSTRATIVE EMBODIMENT

Embodiments of the present invention provide systems and methods for enabling a sender of a voicemail message to delete the voicemail message before it is heard by the intended recipient. Additionally, embodiments of the present invention provide systems and methods for providing notification that a pending voicemail message has been heard by a recipient to a communications device specified by the message sender. In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Figure 1:
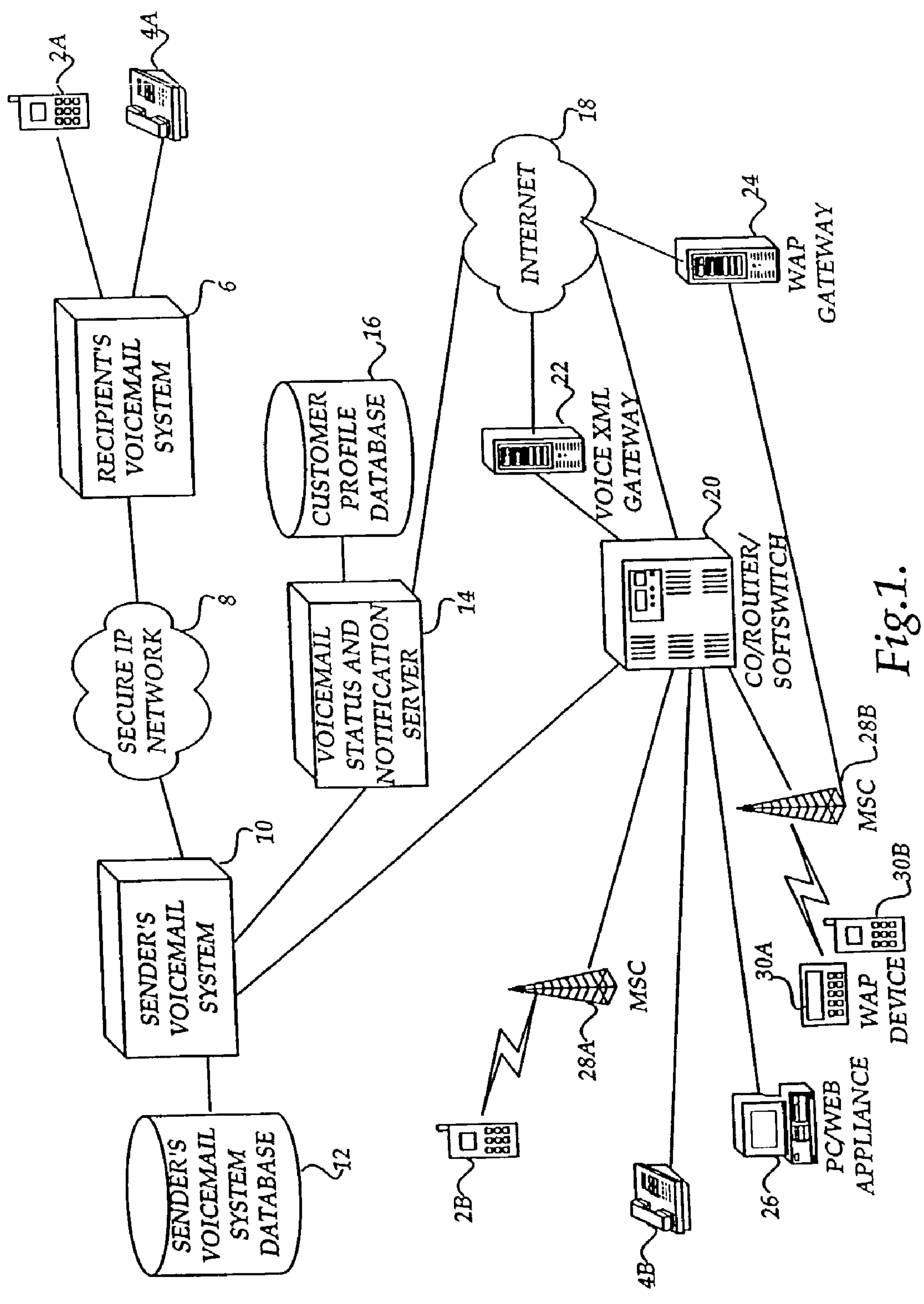
FIG. 1 is a network diagram showing an illustrative operating environment utilized by various embodiments of the invention.

Referring now to the drawings, in which like numerals represent like elements through the several figures, aspects of the present invention and the illustrative operating environment will be described. FIG. 1 shows an illustrative operating environment utilized by various embodiments of the invention. According to one embodiment, a recipient's voicemail system 6 is provided that is a conventional voicemail system. The recipient's voicemail system 6 can receive and store voicemail messages for a recipient until the recipient listens to the messages using conventional technology such as a wireline telephone 4A or a wireless telephone 2A. According to various embodiments of the present invention, the recipient's voicemail system 6 may also be configured to respond to a change in message status by transmitting status messages through a secure Internet Protocol network 8 to the sender's voicemail system 10 and to delete pending messages in response to receiving a deletion request from the sender of a voicemail message. Additional details regarding the operation of the recipient's voicemail system 6 will be provided below with respect to FIGS. 4A–8B.

The sender's voicemail system 10 also comprises a conventional voicemail system. The sender's voicemail system 10 has additional functionality for receiving status messages from the recipient's voicemail system 6 and storing the messages in the database 12. The sender's voicemail system 10 can also send status change messages to the voicemail status and notification server 14 in response to receiving status messages from the recipient's voicemail system 6. The status change messages include information indicating that the voicemail message was heard by the recipient. The status change messages may also include information indicating that the other types of status changes have occurred with respect to the voicemail message. The sender's voicemail system 10 can also send deletion requests to the recipient's voicemail system 6 in response to receiving a deletion request from the VMSNS 14. Additional details regarding the operation of the sender's voicemail system 10 will be provided below with respect to FIGS. 4A–8B.

As shown in FIG. 1, embodiments of the present invention also include a voicemail status and notification server ("VMSNS") 14. The VMSNS 14 comprises a standard server computer connected to the Internet 18 or other type of distributed computing network. The VMSNS 14 is operative to create and maintain subscriber accounts that allow the subscriber to delete messages sent to the recipient's voicemail system 6 and that allow the subscriber to receive notification of a change in status of a voicemail left at the recipient's voicemail system 6. In order to provide this functionality, the voicemail status and notification server 14 maintains a customer profile database 16. As will be described in greater detail below with respect to FIG. 1, the customer profile database 16 includes data for each subscriber identifying the subscriber and identifying one or more devices for notifying the subscriber of a change in the status of a voicemail. In particular, the customer profile database 16 may store a subscriber record containing data identifying a telephone number, wireless application protocol address, pager address, or other information identifying a device upon which the sender will be notified.

The VMSNS 14 is also connected to the sender's voicemail 10 via network communication link. As will be described in greater detail below, the connection between the sender's voicemail system 10 and the VMSNS 14 is utilized to transmit messages regarding a change in the status of a voicemail message and for transmitting requests to delete voicemail messages. As will also be described in greater detail below, the voicemail status and notification server 14 may communicate with the sender of a voicemail message via one or more communication devices. In particular, the VMSNS 14 may communicate with the sender via a wireless telephone 2B, a wireline telephone 4B, a personal computer or other type of web appliance 26, a wireless application protocol ("WAP") device such as a text pager 30A or a wireless phone 30B. In order to facilitate communications with these devices, they are communicatively coupled to a communications network through a mobile switching center 28A–28B and a central office 20. WAP devices may also communicate with the Internet 18 and the VMSNS 14 through the WAP gateway 24. Additionally, according to various embodiments of the invention, the VMSNS 14 may provide notification using a computer-generated voice. A voice extensible markup language ("XML") gateway 22 is provided for converting text to voice and voice to text in response to commands from the VMSNS 14. Additional details regarding the operation of the VMSNS 14 will be provided with respect to FIGS. 3A–8B.

Figure 2:
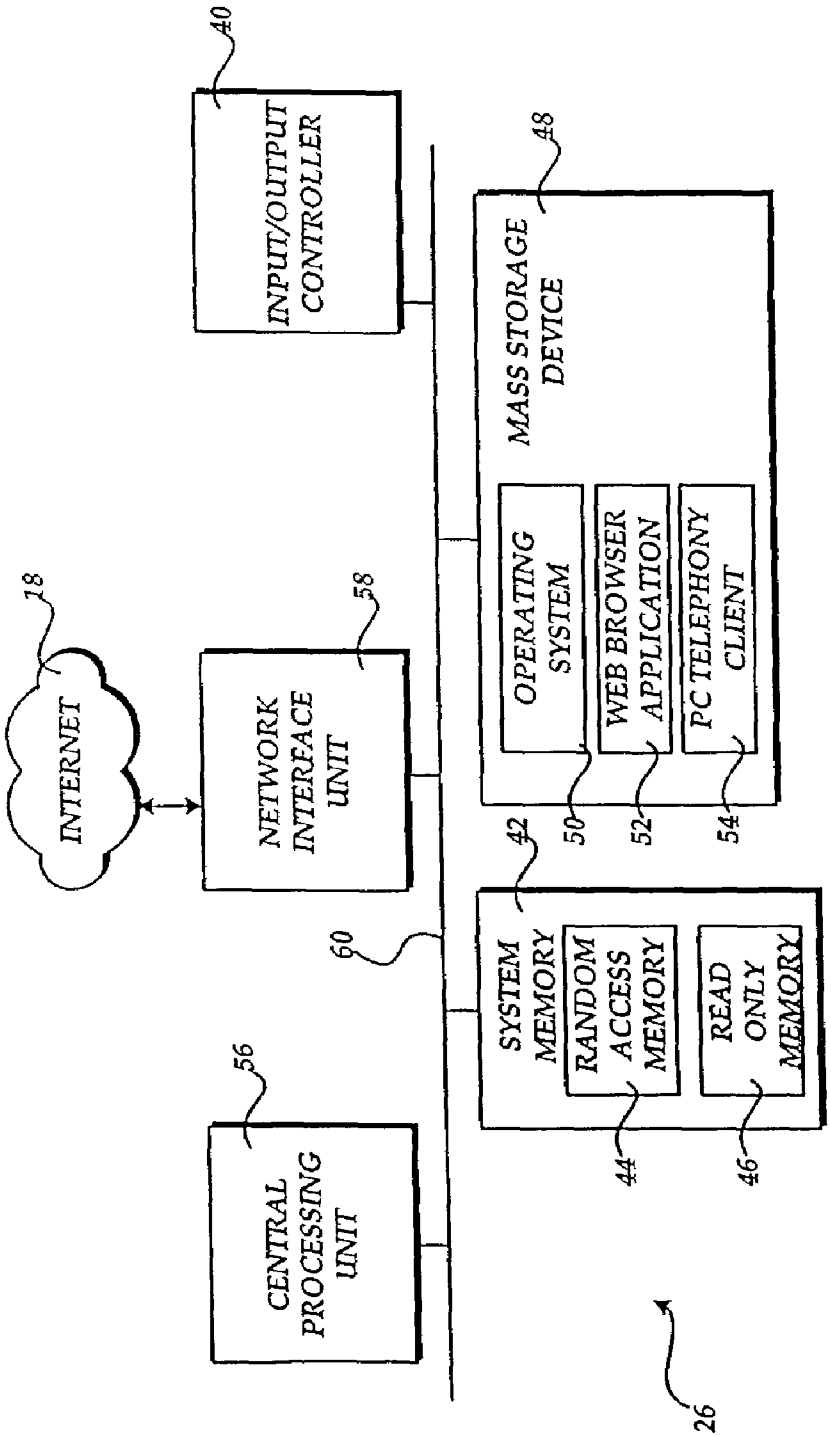
FIG. 2 is a computer architecture diagram illustrating aspects of a personal computer utilized in various embodiments of the present invention.

Turning now to FIG. 2, an illustrative computer architecture for a personal computer 26 for practicing the various embodiments of the invention will be described. The computer architecture shown in FIG. 2 illustrates a conventional personal computer, including a central processing unit 56 ("CPU"), a system memory 42, including a random access memory 44 ("RAM") and a read-only memory ("ROM") 46, and a system bus 60 that couples the memory to the CPU 56. A basic input/output system containing the basic routines that help to transfer information between elements within the computer, such as during startup, is stored in the ROM 46. The personal computer 26 further includes a mass storage device 48 for storing an operating system 50, application programs, such as the web browser application program 52 and a PC telephony client 54.

The mass storage device 48 is connected to the CPU 56 through a mass storage controller (not shown) connected to the bus 60. The mass storage device 48 and its associated computer-readable media, provide non-volatile storage for the server computer 26. Although the description of computer-readable media contained herein refers to a mass storage device, such as a hard disk or CD-ROM drive, it should be appreciated by those skilled in the art that computer-readable media can be any available media that can be accessed by the personal server computer 26.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 26 may operate in a networked environment as shown in FIG. 1 using logical connections to remote computers through a network, such as the Internet 18. The personal computer 26 may connect to the Internet 18 through a network interface unit 58 connected to the bus 60. It should be appreciated that the network interface unit 58 may also be utilized to connect to other types of networks and remote computer systems. The personal computer 26 may also include an input/output controller 32 for receiving and processing input from a number of devices, including a keyboard or mouse (not shown). Similarly, an input/output controller 40 may provide output to a display screen, a printer, or other type of output device.

As mentioned briefly above, a number of program modules, applications, and data files may be stored in the mass storage device 48 and RAM 44 of the personal computer 26, including an operating system 50 suitable for controlling the operation of a networked computer 26. The mass storage device 48 and RAM 44 may also store one or more application programs including a web browser application program 52 and a PC telephony client 54. As known to those skilled in the art, the web browser program 52 comprises an application program for accessing and displaying web pages created in the hypertext markup language ("HTML"). Examples of web browser application programs include INTERNET EXPLORER from the MICROSOFT CORPORATION of Redmond, Wash. and NAVIGATOR from the NETSCAPE CORPORATION. Additionally, as known to those skilled in the art, the PC telephony client 54 comprises an application program that allows a user to make and receive telephone calls over the Internet 18. In order to make and receive such telephone calls, the personal computer 26 may be further equipped with a microphone and speaker (not shown).

It should be appreciated that the conventional computer architecture shown in FIG. 2 may also be utilized by many of the computing components shown in FIG. 1. In particular, a similar computing architecture may be utilized for the recipient's voicemail system 6, the sender's voicemail system 10, the voice XML gateway 22, the WAP gateway 24, the wireless telephone 2B, and the WAP devices 30A–30B. It should be appreciated by those skilled in the art that each of the individual devices identified herein may require additional or fewer computing components as known to those skilled in the art.

Referring now to FIG. 3A, an illustrative database architecture will be described for a database record maintained by the VMSNS 14. The customer profile database 16 is maintained by the VMSNS 14 and is utilized to store fields 16A–16K associated with each subscriber of the services provided by the various embodiments of the present invention (also referred to as the "subscriber", "customer", "sender", or "sender of the voicemail message"). Together, fields 16A–16K define a customer profile stored in the customer profile database 16. Field 16A stores a customer's login identity. Field 16B stores a customer's password. Fields 16C–16G store various device addresses for devices upon which the subscriber may be notified that a pending voicemail message has been heard by the recipient. In particular, the database field 16C identifies an electronic mail address at which the customer may be notified that a change in status has occurred. The database field 16D identifies a short messaging system address at which the customer may be notified. The database field 16E identifies a telephone number at which the sender may be identified via a voice message that the status of a sent voice mail message has changed. The database field 16F identifies a WAP address at which a notification may be provided and the database field 16G provides a pager address at which a notification may be provided. These fields are not limited to these devices, but may identify any number of communication devices and corresponding device addresses. Fields 16H–16K store a customer's preferred method of notification and corresponding device address and may include more or fewer than the four preferences shown in FIG. 3A.

As will be described in greater detail below, the contents of the customer profile database profile 16, including the database field 16A–16K are utilized by the VMSNS 14 to provide a notification to the sender of a voice mail message that a status change has occurred. In particular, a notification message may be transmitted by the VMSNS 14 to one of the addresses identified in database field 16C–16G. The device addresses identified in field 16C–16G may be ordered in priority by the subscriber as shown in database field 16H–16K. In the event that a notification message cannot be successfully transmitted to the sender at one of the device addresses, the VMSNS 14 may be operative to attempt to contact the subscriber at a subsequent device address.

Turning to FIG. 3B, an illustrative database architecture will be described for the sender's voicemail system database 12. As described briefly above, the sender's voicemail system 10 maintains the sender's voicemail system database 12. The sender's voicemail system database 12 includes a number of database fields 12A–12D that identify and provide the status of a voicemail message sent by a sender at the recipient's voicemail system 6. In particular, fields 12A–12D store information contained in status messages sent by the recipient's voicemail system 6 in response to receiving a voicemail message or in response to a change in status of a voicemail message. Field 12A stores the directory number of the telephone number used by the sender to leave the voicemail message. This data is captured by the recipient's voicemail system 6 using a conventional technology such as caller ID. Field 12B stores the recipient's directory number. Field 12C stores the time and date that the status identified in field 12D changed. For instance, the database field 12C may contain a time and date that the status of a voice mail message changed from unheard to being heard by the recipient. In this case, the status would also be changed from pending to heard.

It should be appreciated that the sender's voicemail system 10 maintains only one database record per voicemail message and updates the individual record as the status for that voicemail message changes. Additionally, as will be described in greater detail below, once the voicemail message has been deleted from the recipient's voicemail system 6, the database record associated with the voicemail message and stored in the sender's voicemail system database 12 is deleted. The sender's voicemail database is not limited to storing only the information contained in fields 12A–12D, but may store more information as desired or required by alternate embodiments of the invention.

Figure 4A:
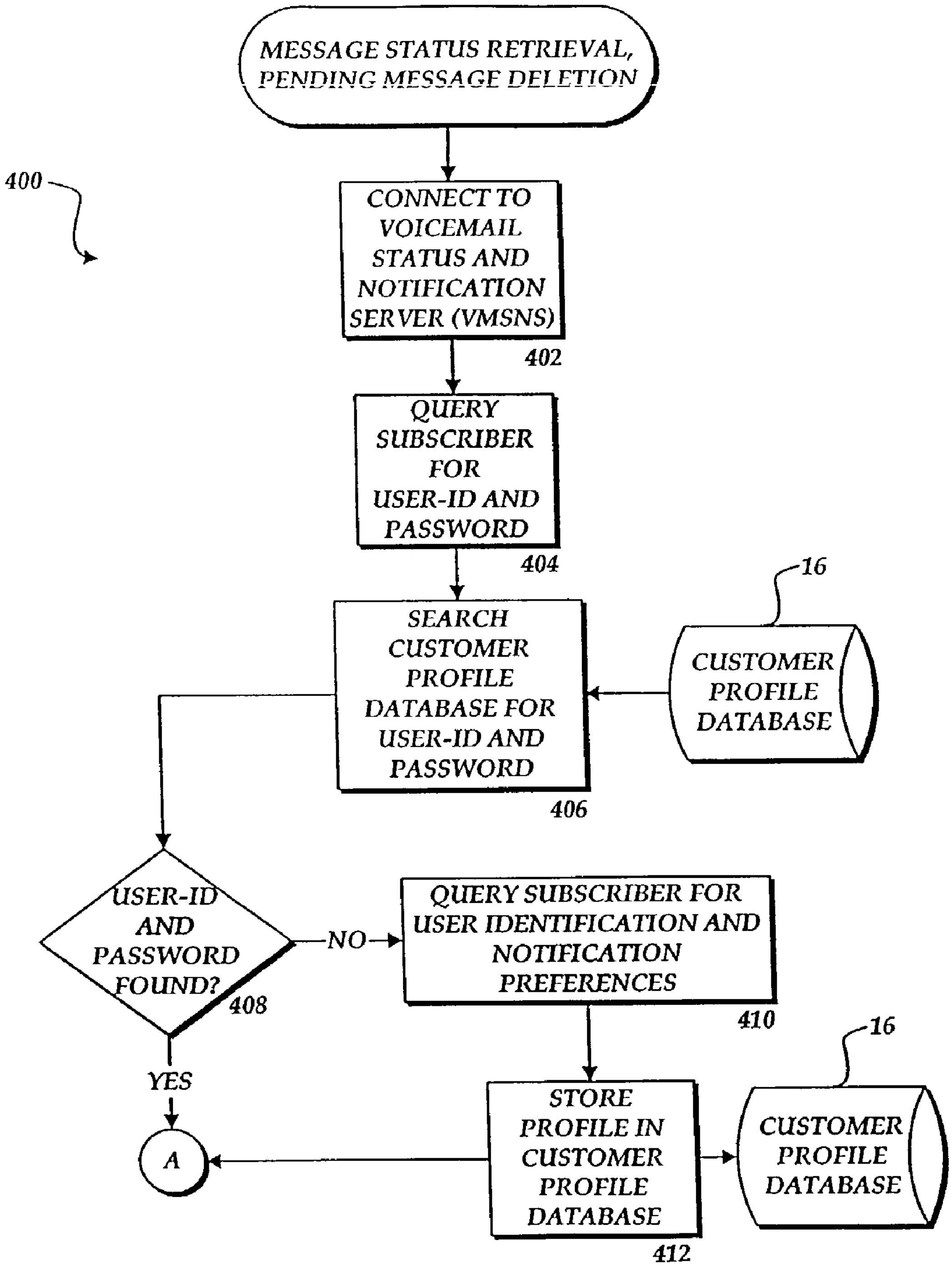
FIGS. 4A–4B are flow diagrams showing an illustrative routine for retrieving voicemail message status and deleting pending voicemail messages according to one embodiment of the present invention.
Figure 4B:
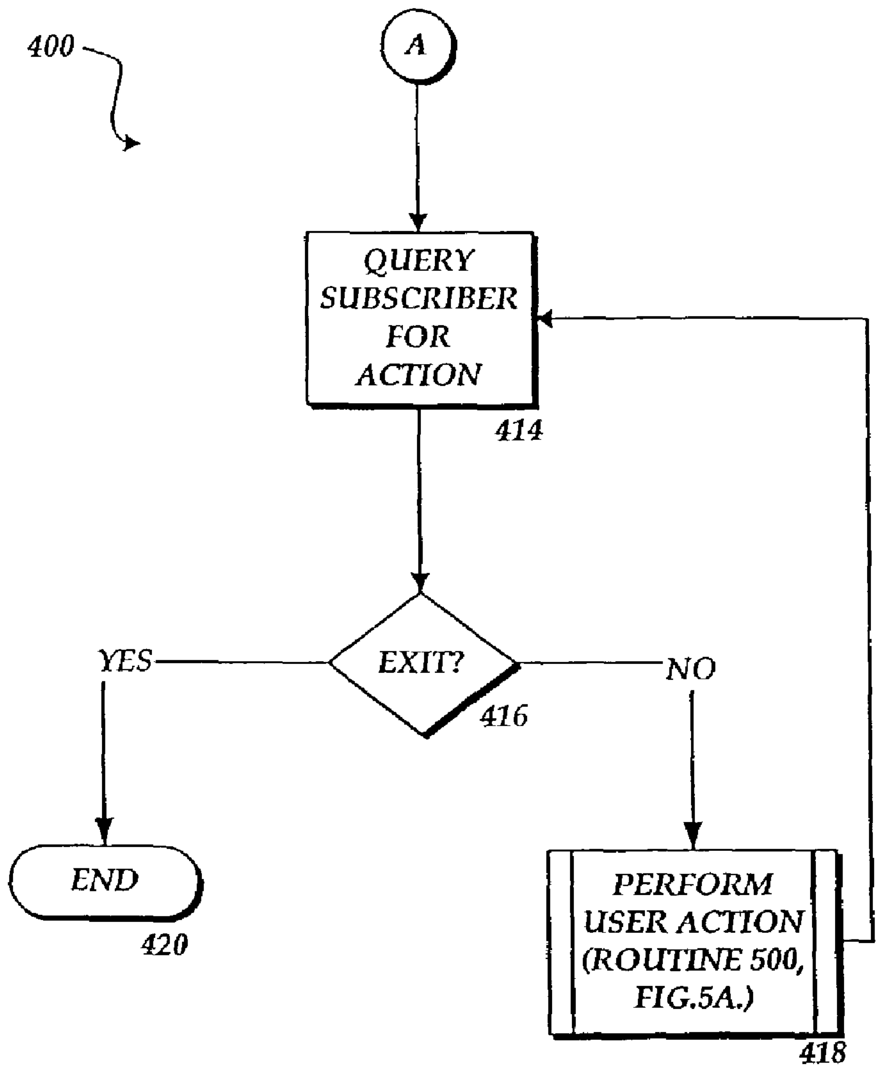
Figure 5A:
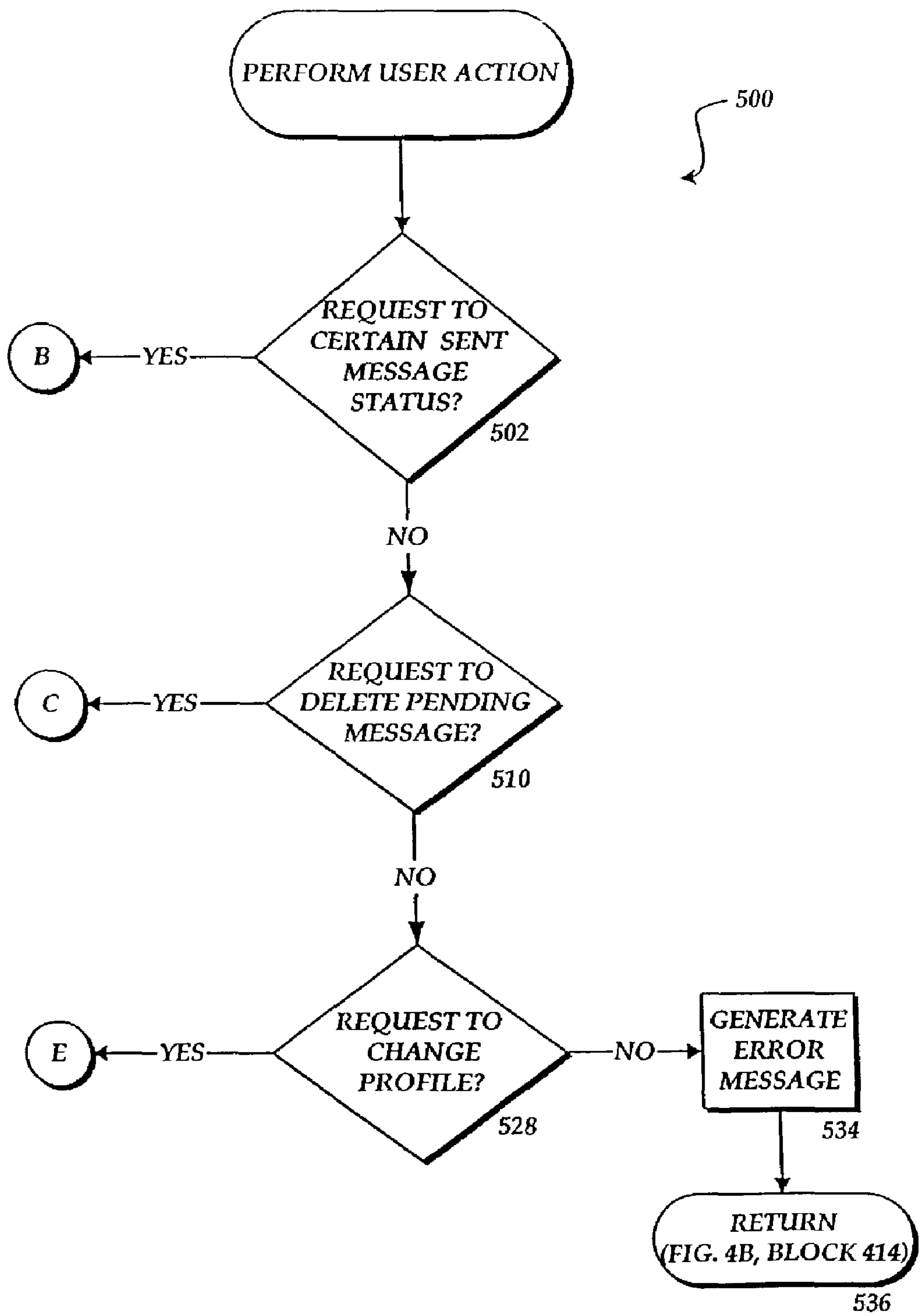
FIGS. 5A–5E are flow diagrams showing an illustrative routine for performing an action in response to a user request to view sent message status, to delete a pending message, or to change a user profile according to one embodiment of the present invention.
Figure 5B:
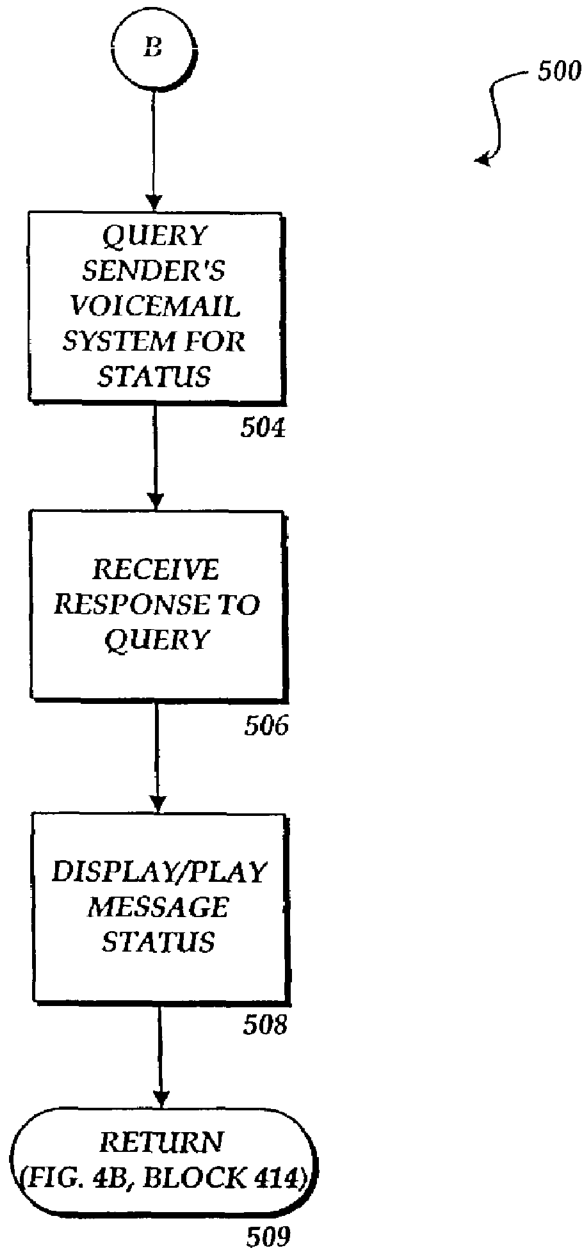
Figure 5C:
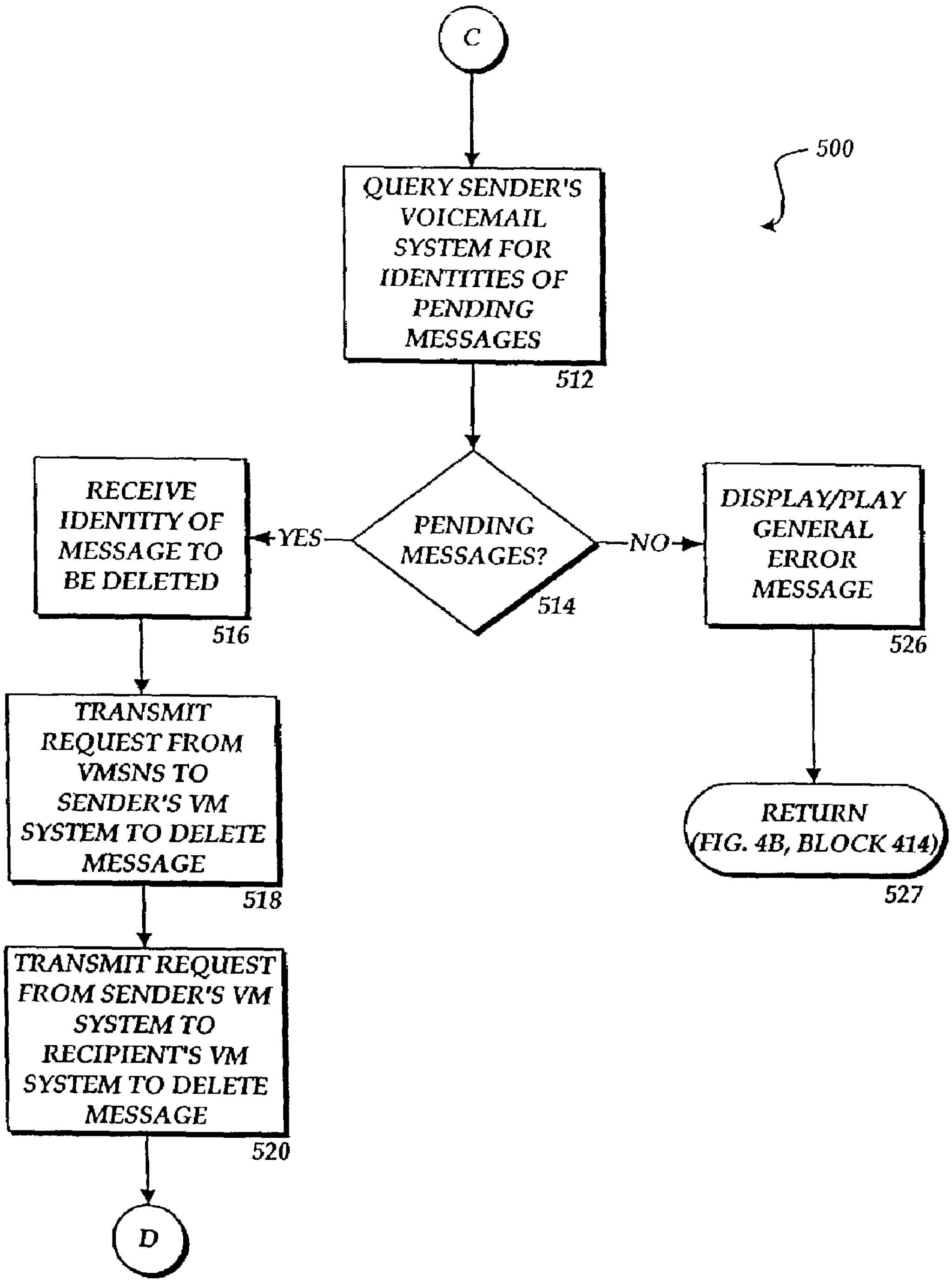
Figure 5D:
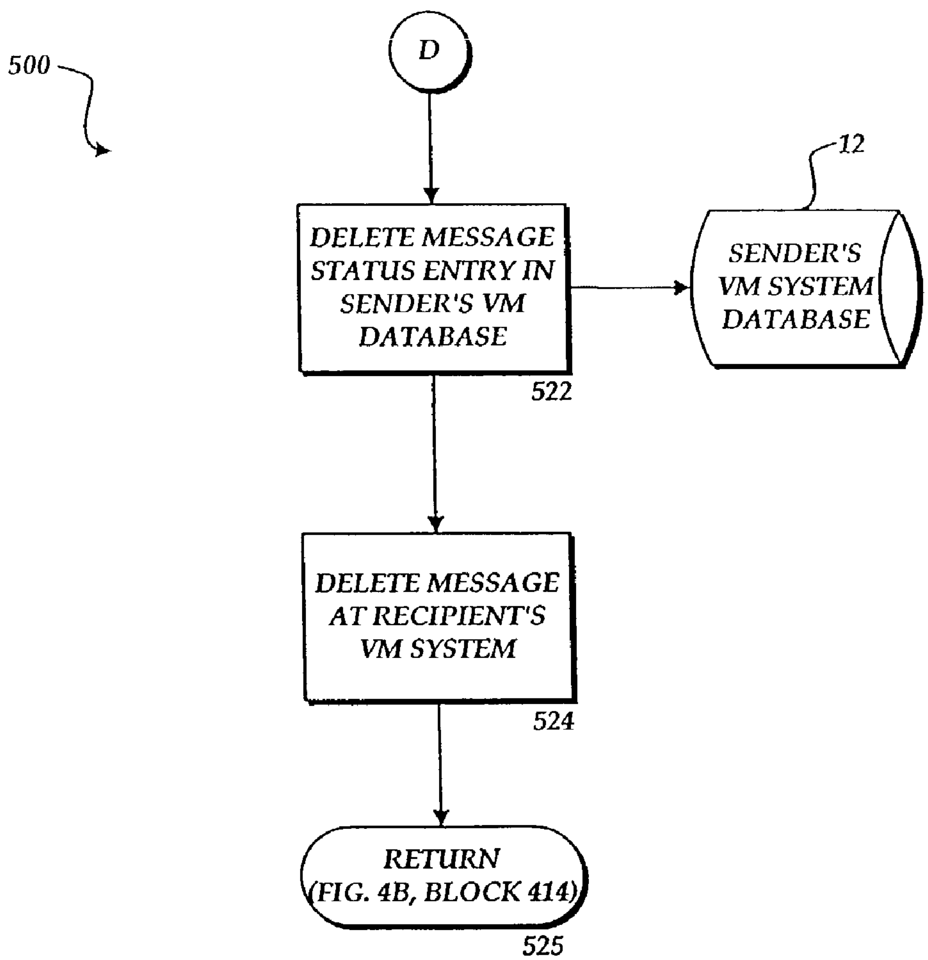
Figure 5E:
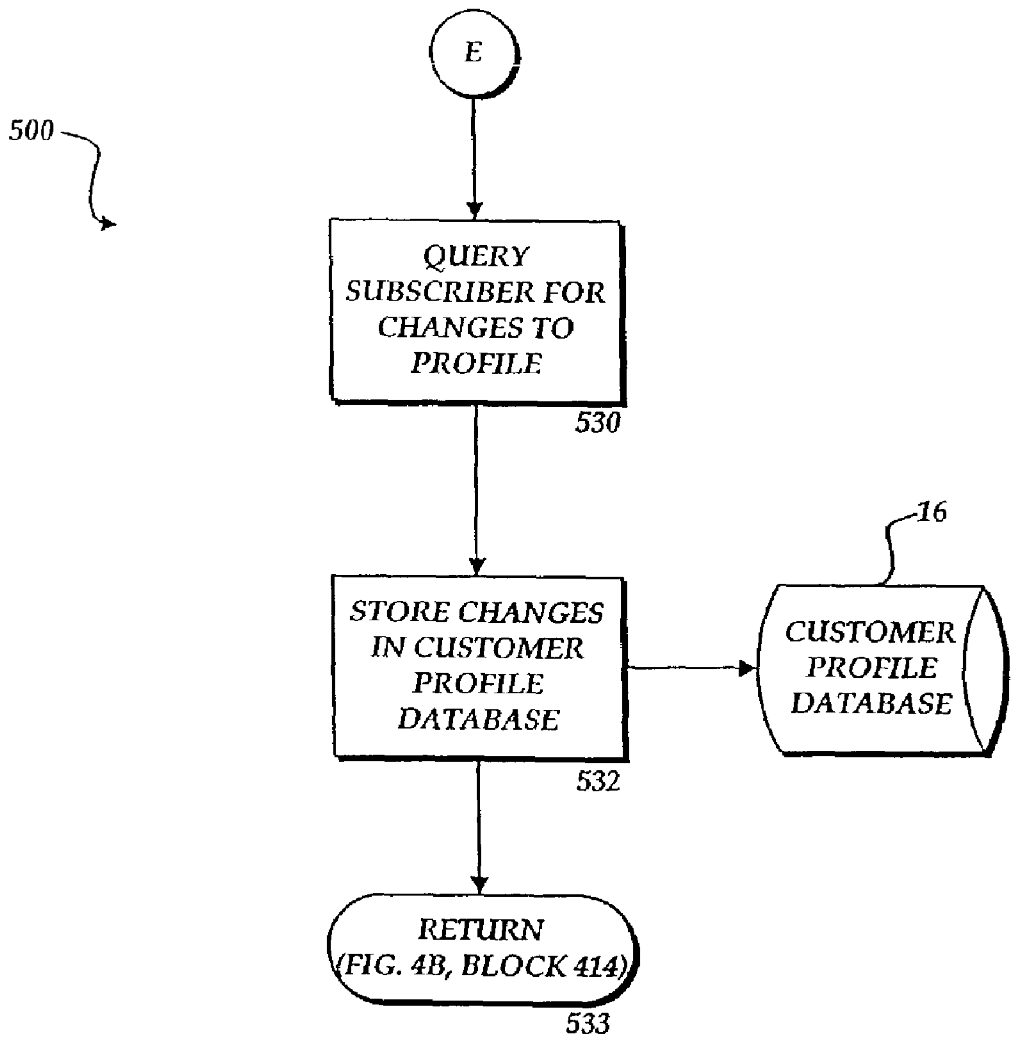

Referring now to FIGS. 4A–4B, an illustrative routine 400 will be described illustrating aspects of the operation of the VMSNS 14 for retrieving and viewing the status of sent voicemail messages and for deleting pending voicemail messages. The routine 400 begins at block 402, where a subscriber connects to the VMSNS 14 through the Internet 18. The connection may be established through the Web using a personal computer 26, or other types of devices and associated means of connecting to the VMSNS 14 through the Internet 18 may be used. For example, a subscriber may use a wireline or wireless telephone, 4B and 2B respectively. If a wireline telephone 4B is used, the telephone transmission may be routed through the central office 20 and through the voice XML gateway 22. If a wireless phone is used, the transmission must pass through a mobile switching center ("MSC") 28A before traveling by wire to the central office 20. If a WAP device 30A–B is used, the transmission travels through the MSC 28B to the WAP gateway 24 and subsequently to the Internet 18.

From block 402, the routine 400 continues to block 404, where the VMSNS 14 queries the subscriber for a user ID and a password. Once this information has been received, the routine 400 continues to block 406, where the VMSNS 14 searches the customer profile database 16 for the user ID and password provided at block 404. Continuing to block 408, the VMSNS 14 determines whether the user ID and password that was provided was located in the customer profile database 16. If the user ID and password was located in the customer profile database 16, the routine 400 branches to block 414. At block 414, the VMSNS 14 queries the subscriber for an action to perform.

From block 414, the routine 400 continues to block 416, where the VMSNS 14 decides if the action requested in response to block 414 was a request to exit. If the VMSNS 14 determines that the subscriber chose to exit, the routine 400 branches to block 420, where the routine is completed. If the VMSNS 14 determines at block 416 that the user did not choose to exit, but rather chose another action, the routine 400 branches to block 418, where the routine 500, FIGS. 5A–5E begins.

If, at block 408, the VMSNS 14 determines that the user ID and password entered by the subscriber is not in the customer profile database 16, the routine 400 branches to block 410, where the VMSNS 14 allows the user to subscribe for the notification and deletion services. In particular, the VMSNS 14 queries the user for a user ID and notification preferences, such as the device addresses for the devices to which notification messages should be sent, and a preferred order of devices that notifications should be transmitted to.

From block 410, the routine 400 continues to block 412, where the VMSNS 14 stores the user ID and notification preferences input by the new subscriber in the customer profile database 16. This information is depicted in FIG. 3A. As discussed above, this information is not limited to that depicted in FIG. 3A, but may comprise more or less information as desired or required by any particular embodiment of the present invention. The routine 400 then continues from block 412 to block 414, where the VMSNS 14 queries the subscriber for action and to block 418, where the user requested action is performed. An illustrative routine 500 is described below for performing the user requested action.

Turning now to FIGS. 5A–5E, an illustrative routine 500 will be described for performing the action requested by the user. The routine 500 begins at block 502, where the VMSNS 14 decides if the action requested in response to block 418 was to obtain the status of sent voicemail messages. If a request to view sent voicemail message status was made, the routine 500 branches to block 504, where the VMSNS 14 queries the sender's voicemail system 10 for the status of all voicemail messages associated with the sender. From block 504, the routine 500 continues to block 506, where the VMSNS 14 receives a response to the query for voicemail message status from the sender's voicemail system 10.

From block 506, the routine 500 continues to block 508, where the VMSNS 14 displays or plays the results of the message status query for the user. These results will be displayed if the user is communicating with the VMSNS 14 using a PC or web appliance 26 or a WAP device 30A–30B. If the user is communicating with the VMSNS 14 using a voice device such as a telephone 4B or a wireless telephone 2B, the results will be provided using the voice XML gateway 22. In this manner, the results may be provided as audio over the user's telephone 4B or 2B. From block 508, the routine 500 continues to block 509, where the routine 500 returns to block 414 and the subscriber is again queried for action.

If, at block 502, it is determined that a request to obtain sent voicemail message status was not made, the routine 500 branches to block 510, where the VMSNS 14 decides if the user requested action was to delete a pending voicemail message. If the requested action was to delete a pending voicemail message, the routine 500 branches to block 512, where the VMSNS 14 queries the sender's voicemail system 10 for the identities of pending voicemail messages. From block 512, the routine 500 continues to block 514, where the VMSNS 14 determines if any pending voicemail messages exist. If pending emails exist, the routine 500 branches to block 516, where the VMSNS 14 identifies the pending voicemail message to be deleted. From block 516, the routine 500 continues to block 518, where the VMSNS 14 transmits a request to the sender's voicemail system 10 to delete the identified pending voicemail message. From block 518, the routine 500 continues to block 520, where the sender's voicemail system 10 transmits a request to the recipient's voicemail system 6 to delete the pending voicemail message.

From block 520, the routine 500 continues to block 522, where the sender's voicemail system 10 deletes the status message entry corresponding to the voicemail message to be deleted from the sender's voicemail system database 12. From block 522, the routine 500 continues to block 524, where the recipient's voicemail system 6 deletes the pending voicemail message. From block 524, the routine 500 continues to block 525, where the routine returns to block 414 and queries the subscriber is again queried for action.

If, at block 514, it is determined that there are no pending voicemail messages, the routine 500 branches to block 526 where the VMSNS 14 displays or plays an error message indicating that there are no pending messages to delete. For example, a subscriber might request deletion of a voicemail message using a PC 26. After failing to find the requested pending message, VMSNS 14 might instruct the PC 26 to display a message indicating that there are no pending voicemail messages to delete. From block 526, the routine 500 continues to block 527, where the routine 500 returns to block 414 and queries the subscriber for additional action.

If, at block 510, it is determined that a request to delete pending voicemail messages was not received, the routine 500 branches to block 528, where the VMSNS 14 determines if the user has requested to change the user's profile. If the user desires to change the user's profile, the routine 500 branches to block 530, where the VMSNS 14 queries the user for changes to the profile. For example, the user may change the addresses of their devices or other notification preferences. From block 530, the routine 500 continues to block 532, where the VMSNS 14 stores the changes to the user profile in the appropriate entry in the customer profile database 16. From block 532, the routine 500 continues to block 533, at block 533, the routine 500 returns to block 414 where the subscriber is again queried for action.

If, at block 528, the VMSNS 14 determines that the user has not requested to change their profile, the routine 500 branches to block 534, where the VMSNS 14 displays or plays a general error message as a result of the user's failure to request an available action or requesting to exit the program. The routine 500 the returns to block 414, where the user is prompted again.

Figure 6:
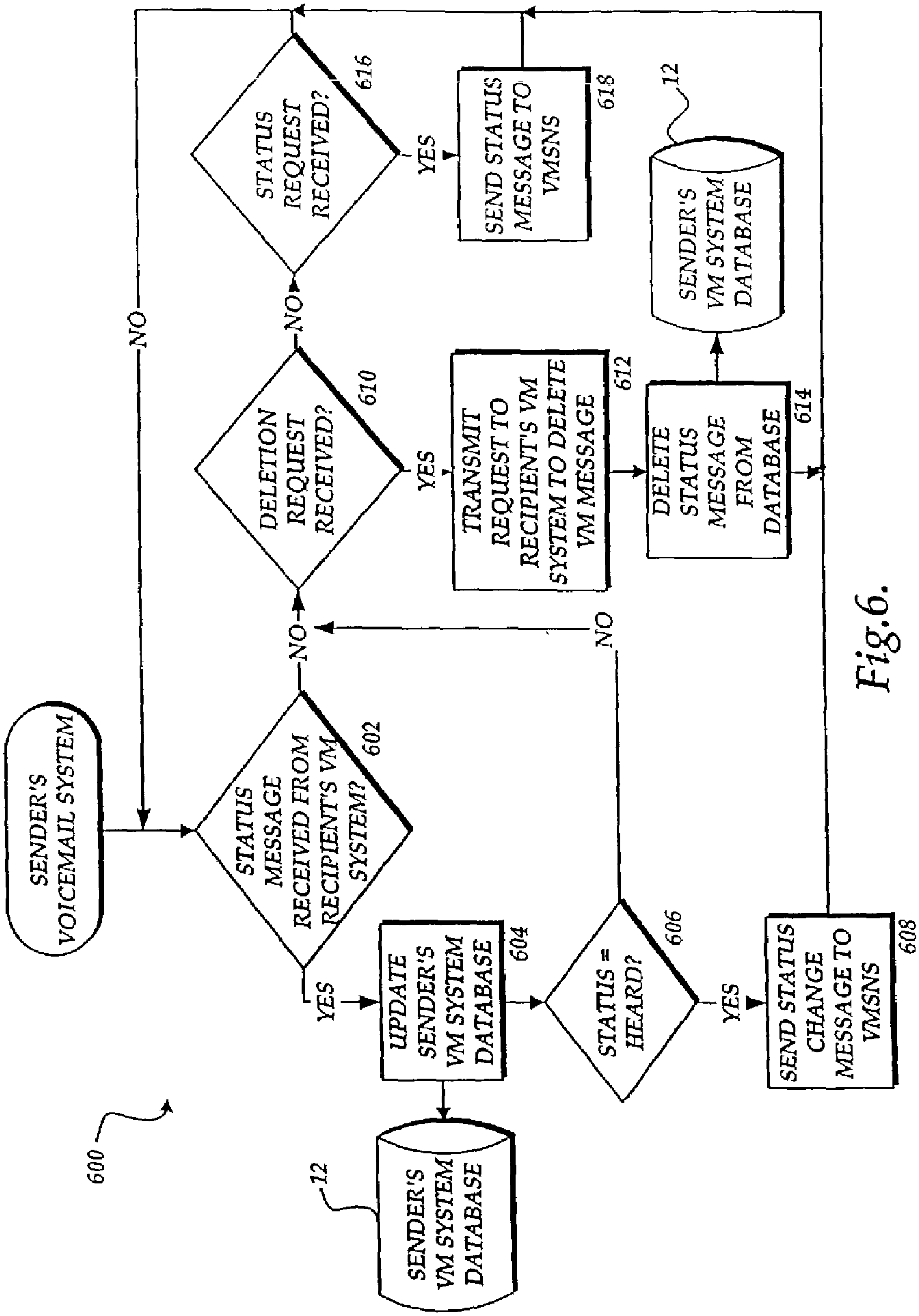
FIG. 6 is a flow diagram showing an illustrative routine for controlling the operation of a voicemail system associated with a sender according to one embodiment of the present invention.

Turning now to FIG. 6, an illustrative routine 600 will be described for controlling the operation of the sender's voicemail system 10 according to one embodiment of the invention. The routine 600 starts at block 602, where the sender's voicemail system 10 determines if a status message has been received from the recipient's voicemail system 6. As described briefly above, the recipient's voicemail system 6 transmits a notification message to the sender's voicemail system 10 in response to change in status of a voicemail stored at the recipient's voicemail system 6. For instance, if a message has been heard by the recipient, if the message has been deleted by the recipient, or if other actions occur with respect to the voicemail message, a status message may be transmitted. If a status message has been received, the routine 600 branches to block 604, where the sender's voicemail system 10 stores the information contained in the status message in the sender's voicemail system database 12.

From block 604, the routine 600 continues to block 606, where the sender's voicemail system 10 determines if the status information contained in the status message indicates that the message has been heard by the recipient. If the status of the voicemail message is "heard", the routine 600 branches to block 608, where the sender's voicemail system 10 transmits a status change message to the VMSNS 14 indicating that the voicemail message has been heard by the recipient. From block 608, the routine 600 returns to block 602.

If, at block 606 the sender's voicemail system 10 determines that the status message indicates that the status is other than heard, the routine 600 branches to block 610. Similarly, if at block 602, the sender's voicemail system 10 determines that a status message was not received, the routine 600 branches from block 602 to block 610. At block 610, the sender's voicemail system 10 determines whether a request to delete a voicemail message has been received. If a request to delete a voicemail message has been received, the routine 600 branches to block 612, where the sender's voicemail system 10 transmits a request to the recipient's voicemail system 6 to delete the identified voicemail message. From block 612, the routine 600 continues to block 614, where the sender's voice-ail message systems 10 deletes the database record associated with the voicemail message and stored in the sender's voicemail system database 12. From block 614, the routine 600 returns to block 602.

If, at block 610, it is determined that a request to delete a voicemail message was not received, the routine 600 branches to block 616, where the sender's voicemail system 10 determines if a request for voicemail message status has been received. If a request for voicemail message status has been made, the routine 600 branches to block 618, where the sender's voicemail system 10 transmits a status message to the VMSNS 14 indicating the status of the identified voicemail message. From block 618, the routine 600 returns to block 602.

Figure 7:
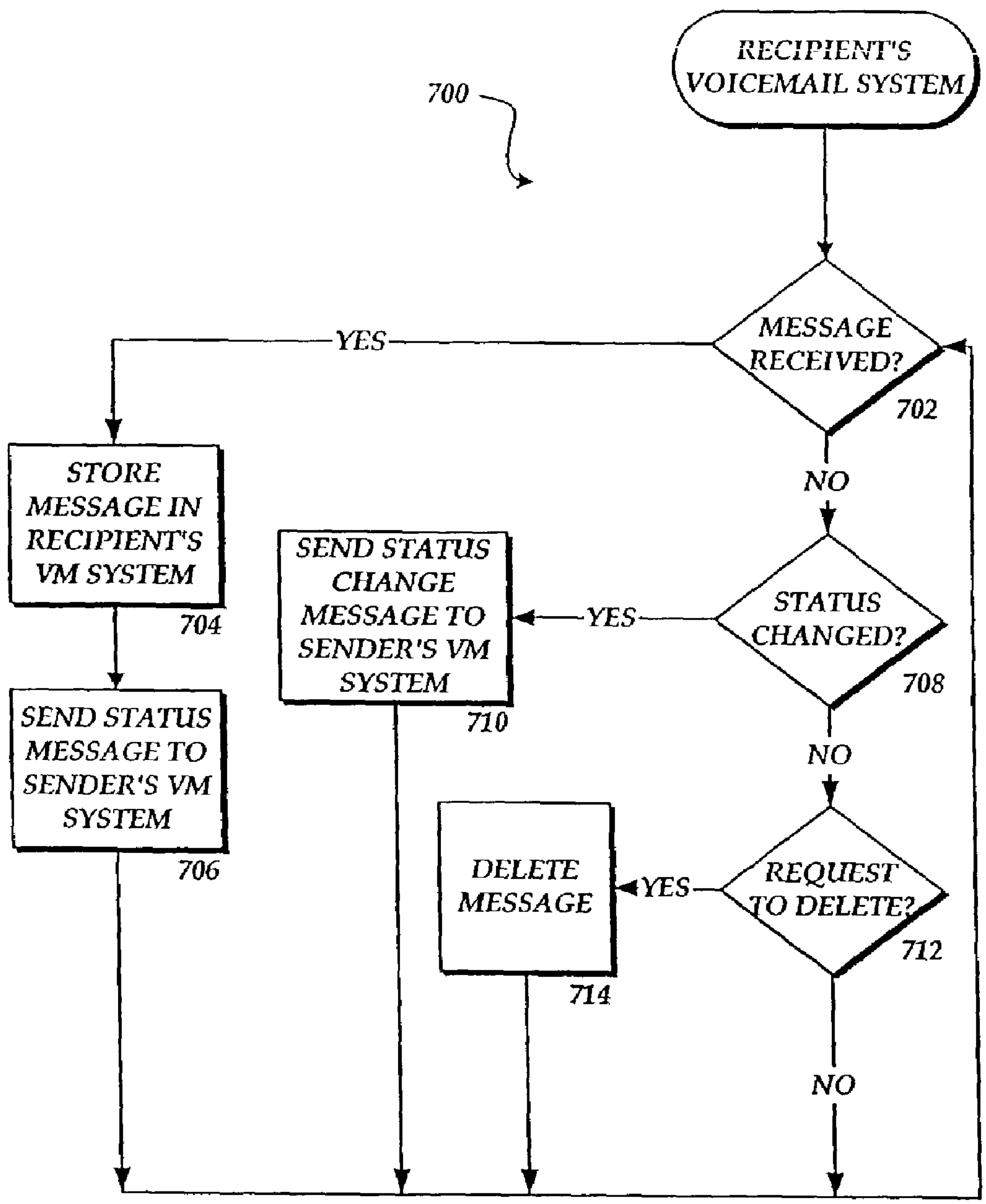
FIG. 7 is a flow diagram showing an illustrative routine for controlling the operation of a voicemail system associated with a recipient according to one embodiment of the invention.

Referring now to FIG. 7, an illustrative routine 700 will be described for controlling the operation of the recipient's voicemail system 6 according to one embodiment of the invention. The routine 700 starts at block 702, where the recipient's voicemail system 6 determines if a voicemail message has been received. If a voicemail message has been received, the routine 700 branches to block 704, where the recipient's voicemail system 6 stores the voicemail message. From block 704, the routine 700 continues to block 706, where the recipient's voicemail system 6 transmits a status message to the sender's voicemail system 10. This status message may contain the information depicted in FIG. 3B. For example, the status message may contain the recipient's directory number, the sender's directory number, a time and date that the voicemail message was received, and a pending designation with regards to status if the message was received but not yet heard. From block 706, the routine 700 returns to block 702.

Returning to block 702, if a voicemail message has not been received, the routine 700 branches to block 708, where the recipient's voicemail system 6 determines if there has been a change in status in any of the pending voicemail messages. If there has been a status change, the routine 700 branches to block 710, where the recipient's voicemail system 6 transmits a status change message to the sender's voicemail system 10. From block 710, the routine 700 returns to block 702.

Returning to block 708, if the recipient's voicemail system 6 determines that there has not been a change in voicemail message status, the routine 700 branches to block 712, where the recipient's voicemail system 6 determines if it has received a request to delete a voicemail message. If the recipient's voicemail system 6 has received a request to delete a voicemail message, the routine 700 branches to block 714, where the recipient's voicemail system deletes the voicemail message. From block 714, the routine 700 returns to block 702. Returning to block 712, if the recipient's voicemail system has not received a request to delete a voicemail message, the routine returns to block 702.

It should be appreciated that in an alternate embodiment of the invention, the subscriber could connect directly to the sender's voicemail system 10, bypassing the VMSNS 14. Any queries or commands given by the VMSNS 14 in the description above could be transmitted directly from the sender. Alternately, the recipient's voicemail system 6 could direct communication and receive communication directly to and from the VMSNS 14 without utilizing the sender's voicemail system 10. All information stored in the sender's voicemail system database 12 could be stored in the customer profile database 16 and utilized by VMSNS 14.

Figure 8A:
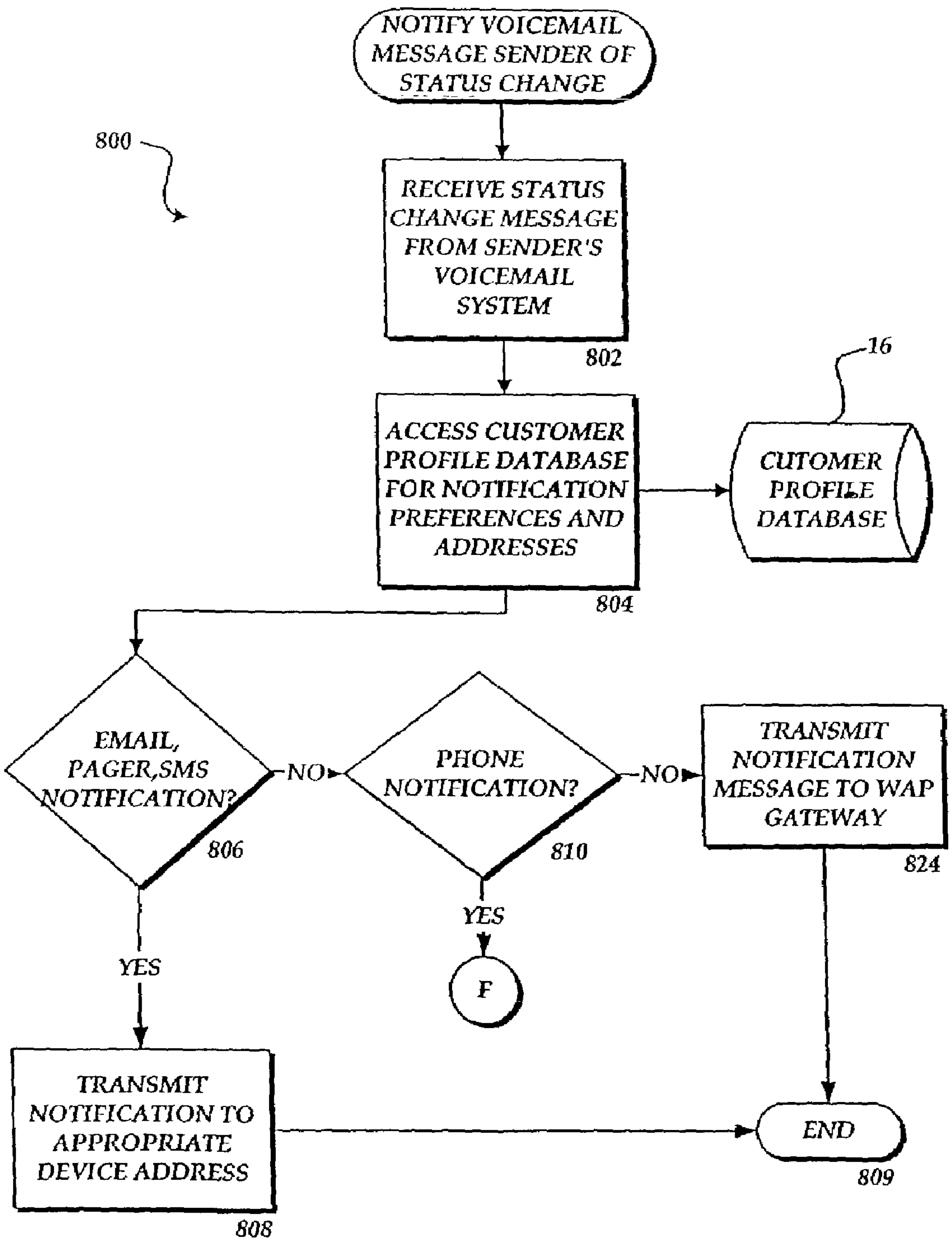
FIGS. 8A–8B are flow diagrams showing an illustrative routine for notifying a voicemail message sender of a change in the status of the voicemail message according to one embodiment of the present invention.
Figure 8B:
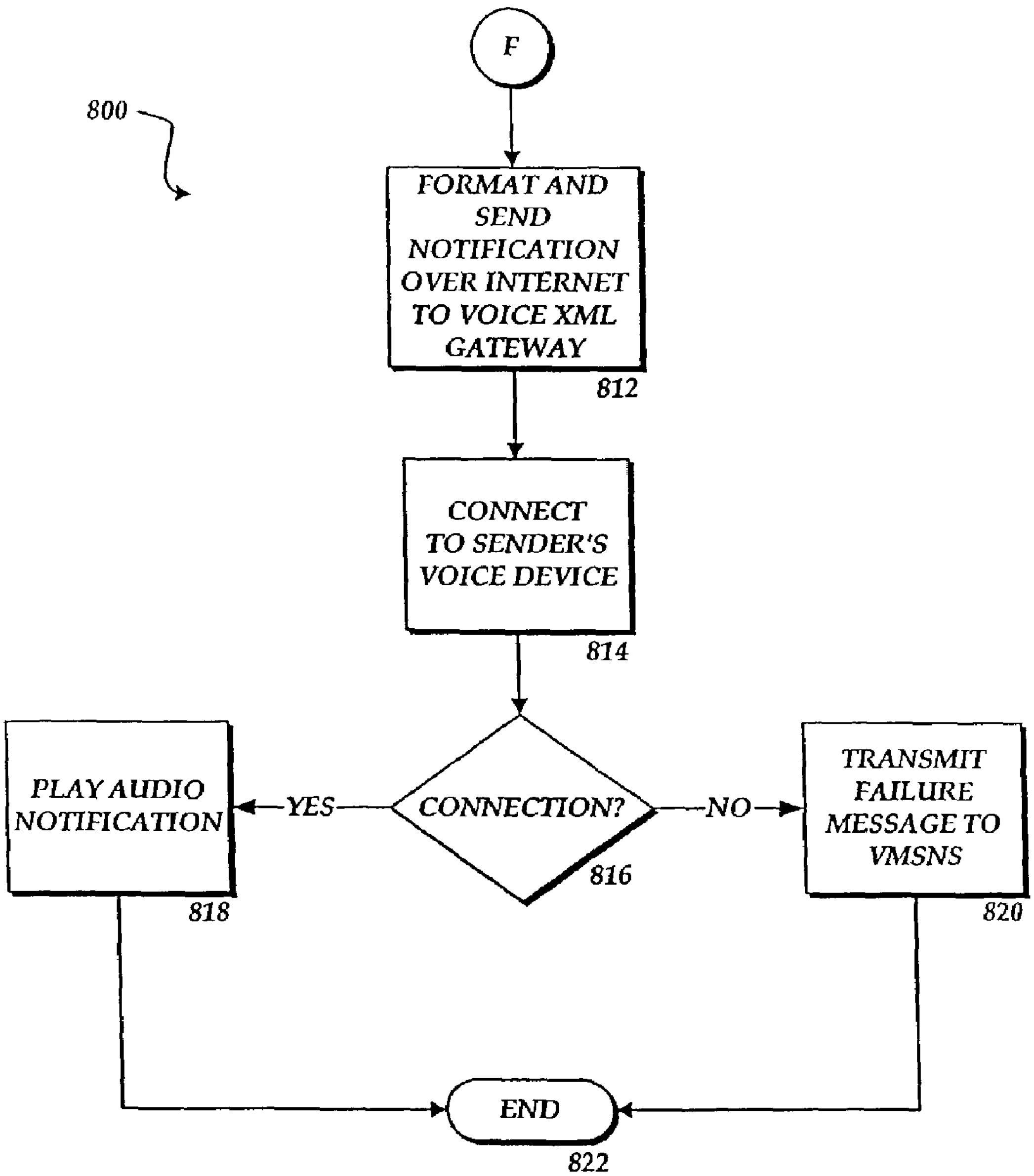

Turning now to FIG. 8, an illustrative routine 800 will be described for notifying a voicemail message sender of a change in the status of the voicemail message according to one embodiment of the present invention. The routine 800 starts at block 802 where the VMSNS 14 receives a status change message from the sender's voicemail system 10. From block 802, the routine 800 continues to block 804, where the VMSNS 14 accesses the customer profile database 16 to retrieve the sender's notification preferences and corresponding device addresses. This information is depicted in fields 16H–16K of FIG. 3A.

From block 804, the routine 800 continues to block 806, where the VMSNS 14 determines if the preferred method of notification is by electronic mail, pager, or short message service. If the preferred method of notification is electronic mail, pager, or SMS, the routine 800 branches to block 808, where the VMSNS 14 transmits notification to the appropriate device address. From block 808, the routine 800 continues to block 809 where the routine ends.

Returning to block 806, if the preferred method of notification is not electronic mail, pager, or SMS, the routine branches to block 810, where the VMSNS 14 determines if the preferred method of notification is by telephone. If the preferred method is by telephone, the routine 800 branches to block 812, where the VMSNS 14 formats and sends notification that the voicemail message has been heard to the sender over the Internet 18 to the voice XML gateway 22. From block 812, the routine 800 continues to block 814, where the XML gateway 22 connects to the sender's telephone 4B or wireless telephone 2B. From block 814, the routine 800 continues to block 816, where the XML gateway 22 determines if a connection has been successfully established with the sender's device.

If a connection is established, the routine 800 branches to block 818, where an audio notification is played. The routine 800 then continues to block 822 where the routine 800 ends. If a connection is not established with the sender's device, the routine 800 branches from block 816 to block 820, where a failure message is transmitted to the VMSNS 14 and the routine 800 continues to block 822 where the routine 800 ends. In alternate embodiments of the invention, upon failure to connect, the VMSNS 14 may select an alternate notification device based upon the user profile and continue to transmit notification messages until a successful connection is established with one of the sender's devices.

Returning to block 810, if the preferred method of notification is not by telephone, the routine 800 branches to block 824, where the VMSNS 14 transmits a request to the WAP gateway 24 for notification to a WAP device 30A or 30B. From block 824, the routine continues to block 809 where the routine 800 ends.

In an alternate embodiment of the invention, notification to a sender that a voicemail message sent to a recipient has been heard could include the recipient's name determined using a directory lookup procedure as known in the art. For example, upon receiving a status change message and retrieving a sender's notification preferences and device addresses, the VMSNS 14 could use the recipient's directory number from the status change message to lookup the recipient's name through a lightweight directory access protocol. This information could then be included in the notification message.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A system for enabling the deletion of a pending voicemail message, the system comprising:

a voicemail system associated with a recipient capable of receiving and storing a voicemail message sent by a sender and intended for the recipient, of transmitting a status message to a voicemail system associated with the sender in response to receiving the voicemail message, and of deleting the voicemail message in response to a request from the voicemail system associated with the sender; and a voicemail system associated with the sender capable of receiving the status message from the voicemail system associated with the recipient, storing the status message in a database record associated with the sender, and transmitting a request to the voicemail system associated with the recipient to delete a voicemail message in response to receiving a deletion request from a server computer; and a server computer operative to receive a request to delete the voicemail message and, in response to receiving the request, determining based upon the database record whether the voicemail message is pending, and, in response to determining that the message is pending, transmitting a request to the voicemail system associated with the sender to delete the voicemail message, wherein the voicemail system associated with the sender is further operative to delete the status message from the database record associated with the sender following transmission of the request to the voicemail system associated with the recipient to delete the voicemail message and wherein the voicemail system associated with the recipient is further capable of transmitting a notification message to the recipient indicating that the voicemail message has been deleted.

2. The system of claim 1 wherein the server computer is further operative to transmit the request to delete the voicemail message directly to the voicemail system associated with the recipient.

3. The system of claim 1 wherein the voicemail system associated with the sender is further operative to receive a request directly from the sender to delete the voicemail message, to determine whether the voicemail message is pending, and in response to determine that the voicemail message is pending, transmitting the request.

4. The system of claim 1 wherein the voicemail system associated with the recipient is further capable of determining if a voicemail message associated with the sender may be deleted prior to deleting the voicemail message in response to a request to delete the voicemail message.

5. The system of claim 1 wherein the status message comprises a directory number associated with the sender, a directory number associated with the recipient, a time and a date of a change in message status, and message status.

6. The system of claim 5 wherein the message status comprises an indicating that the voicemail message has been heard.

7. A method for enabling the deletion of a voicemail message that is pending, the method comprising:

receiving and storing a voicemail message at a voicemail system associated with a recipient;

transmitting a status message from the voicemail system associated with the recipient to a voicemail system associated with a sender of the voicemail message in response to receiving the voicemail message;

receiving the status message at the voicemail system associated with the sender and storing the status message in a database record associated with the sender;

receiving a server computer a request to delete the voicemail message;

transmitting a request for the status of the voicemail message from the server computer to the voicemail system associated with the sender;

receiving at the server computer a response to the status request;

determining based upon the response to the status request whether the voicemail message is pending;

transmitting a request to delete the voicemail message from the server computer to the voicemail system associated with the sender in response to determining that the voicemail message is pending receiving the request to delete the voicemail message at the voicemail system associated with the sender and, in response thereto, removing the status message from the database record associated with the sender and transmitting a request to delete the voicemail message to the voicemail system associated with the recipient; and transmitting a notification to the recipient that the voicemail message has been deleted.

8. The method of claim 7 further comprising deleting the voicemail message from the voicemail system associated with the recipient in response to receiving the request to delete the message at the voicemail system associated with the recipient.

9. The method of claim 7 further comprising:

determining at the voicemail system associated with the recipient if the message may be deleted; and deleting the voicemail message in response to determining that the message may be deleted.

10. The method of claim 7 wherein the status message comprises a directory number associated with the sender, a directory number associated with the recipient, a time and a date of change in message status, and message status.

11. A computer-readable medium comprising computer-executable instruction which, when executed by a computer, causes the computer to perform the method of claim 7.

12. A method for causing a notification message to be transmitted to the sender of a voicemail message indicating that the voicemail message has been delivered to the recipient, the method comprising:

delivering the voicemail message to a recipient;

transmitting a status message from the voicemail system associated with the recipient to a voicemail system associated with the sender;

receiving the status message at the voicemail system associated with the sender and, in response thereto, determining whether the voicemail message has been delivered to the recipient;

transmitting a status change message from the voicemail system associated with the sender to a server computer in response to determining that the voicemail message has been delivered to the recipient;

in response to receiving the status change message at the server computer, identifying a preferred method of notifying the sender of delivery of the voicemail and a corresponding device address for the preferred method;

transmitting a notification message to the device address; and determining whether the notification message to the device address was delivered;

in response to the notification message not being delivered, identifying an alternate method of notifying the sender of delivery of the voicemail and a corresponding device address for the alternate method; and transmitting a notification message to the alternate device address.

13. The method of claim 12 further comprising storing the status message in a database record associated with the sender.

14. The method of claim 12 wherein the notification message comprises a directory number associated with the recipient, a time and a date of the voicemail message, and a status for the voicemail message.

15. The method of claim 14 wherein the server computer is further operative to perform a directory lookup using the directory number associated with the recipient to identify a name associated with the recipient and wherein the notification message further comprises the same.

16. A computer-readable medium comprising computer-executable instruction which, when executed by a computer, causes the computer to perform the method of claim 12.

* * * * *